(12) United States Patent
Park et al.

(10) Patent No.: US 11,413,533 B2
(45) Date of Patent: Aug. 16, 2022

(54) METHOD AND APPARATUS FOR RECOMMENDING GAME PLAY STRATEGY

(71) Applicant: NETMARBLE CORPORATION, Guro-gu Seoul (KR)

(72) Inventors: Seung Je Park, Guro-gu Seoul (KR); Young Bak Jo, Guro-gu Seoul (KR)

(73) Assignee: NETMARBLE CORPORATION, Guro-gu Seoul (KR)

( * ) Notice: Subject to any disclaimer, the term of this patent is extended or adjusted under 35 U.S.C. 154(b) by 276 days.

(21) Appl. No.: 16/743,749

(22) Filed: Jan. 15, 2020

(65) Prior Publication Data

US 2020/0238176 A1   Jul. 30, 2020

(30) Foreign Application Priority Data

Jan. 24, 2019   (KR) .................. 10-2019-0009175

(51) Int. Cl.
| | |
|---|---|
| *A63F 13/5375* | (2014.01) |
| *A63F 3/02* | (2006.01) |
| *A63F 13/35* | (2014.01) |
| *A63F 13/497* | (2014.01) |
| *A63F 13/85* | (2014.01) |
| *A63F 11/00* | (2006.01) |
| *A63F 13/822* | (2014.01) |

(52) U.S. Cl.
CPC ............ *A63F 13/5375* (2014.09); *A63F 3/02* (2013.01)

(58) Field of Classification Search
CPC ....................................................... A63F 3/02
See application file for complete search history.

(56) References Cited

U.S. PATENT DOCUMENTS

| | | | |
|---|---|---|---|
| 10,894,215 B1* | 1/2021 | Brown | ............. A63F 13/795 |
| 2008/0167118 A1* | 7/2008 | Kroeckel | .......... G07F 17/3244 463/1 |
| 2020/0030702 A1* | 1/2020 | Benedetto | .......... A63F 13/5375 |

FOREIGN PATENT DOCUMENTS

| | | |
|---|---|---|
| JP | 2008119502 A | 5/2008 |
| JP | 2016024739 A | 2/2016 |
| KR | 1020070052493 A | 5/2007 |
| KR | 201700748327 | 7/2017 |
| KR | 20180098111 A | 9/2018 |

* cited by examiner

*Primary Examiner* — Robert T Clarke, Jr.
(74) *Attorney, Agent, or Firm* — Baker Botts, L.L.P.

(57) ABSTRACT

Disclosed is a game play strategy recommendation method and apparatus. The game play strategy recommendation method includes recording game play data of a user playing a game, extracting a game play feature from the game play data, determining a pro player of the game corresponding to a game play style of the user from the extracted game play feature using a player recommendation model, and providing a game play strategy of the determined pro player to the user.

13 Claims, 8 Drawing Sheets

| Label | Pro chess player name | Technical (0) Locational (1) | Aggressive (0) Defensive (1) | Intuitive (0) Calculative (1) |
|---|---|---|---|---|
| [1] | Mikhail Tal | 0 | 0 | 0 |
| [2] | Hikaru Nakamura | 0 | 0 | 1 |
| [3] | Vassily Ivanchuk | 0 | 1 | 0 |
| [4] | Garry Kasparov | 0 | 1 | 1 |
| [5] | Anatoly Karpov | 1 | 0 | 0 |
| [6] | Viktor Korchnoi | 1 | 0 | 1 |
| [7] | Vladimir Kramnik | 1 | 1 | 0 |
| [8] | Wilhelm Steinitz | 1 | 1 | 1 |

FIG. 5

| Play style | Recommended opening strategy | ECO |
|---|---|---|
| [1] | (White) Ruy Lopez<br>(Black) Sicilian Defense, King's Indian | C60~C99<br>B20~B99, E60~E99 |
| [2] | (White) Queen's Gambit<br>(Black) Sicilian Defence | D06~D69<br>B20~B99 |
| [3] | (White) Ruy Lopez<br>(Black) Sicilian Defense | C60~C99<br>B20~B99 |
| [4] | (White) Ruy Lopez, Queen's Gambit<br>(Black) Sicilian Defense | C60~C99, D06~D69<br>B20~B99 |
| [5] | (White) Queen's Gambit<br>(Black) Caro-Kann | D06~D69<br>B10~B19 |
| [6] | (White) English Opening<br>(Black) French Defense | A13~A39<br>C00~C20 |
| [7] | (White) English Opening<br>(Black) Sicilian Defense, Semi-Slav, Petrov-Defense | A13~A39<br>B20~B99, D43~D47<br>C42~C43 |
| [8] | (White) Vienna Game, King's Gambit<br>(Black) Ruy Lopez | C25~C29, C30~C39<br>C60~C99 |

FIG. 6

METHOD AND APPARATUS FOR RECOMMENDING GAME PLAY STRATEGY

CROSS-REFERENCE TO RELATED APPLICATION(S)

This application claims the priority benefit of Korean Patent Application No. 10-2019-0009175 filed on Jan. 24, 2019, in the Korean Intellectual Property Office, the disclosure of which is incorporated herein by reference for all purposes.

BACKGROUND

1. Field

One or more example embodiments relate to technology for recommending a game play strategy to a user.

2. Description of Related Art

In recent years, computer games have been produced with high quality and high specification, and it is no longer possible to obtain a great differentiation effect by game contents themselves. In addition, as a way to survive in an increasingly competitive game market, game companies provide game-related information such as game guides, efficient game play methods, or game play tips posted by other game users with respect to already-released games online or offline so that game users can easily understand and enjoy the games.

However, the game-related information is not provided during an actual game play, to the game users need to check the information after the game play ends. Due to such a hassle, the game-related information is low in utilization. Accordingly, the game user may frequently experience problems such as unfamiliar manipulation, relatively unfamiliar quest performance and difficulty in leveling up or game playing and thus, may eventually leave the game without having an interest in the game.

SUMMARY

According to an aspect, there is provided a game play strategy recommendation method including recording game play data of a user playing a game, extracting a game play feature from the game play data, determining a pro player of the game corresponding to a game play style of the user from the extracted game play feature using a player recommendation model, and providing a game play strategy of the determined pro player to the user.

The providing of the game play strategy may include providing, to the user, a game play strategy up to a preset number of game play turns from a start of the game or a game play strategy for a preset period of time from the start of the game.

The game may be a chess game, and the providing of the game play strategy may include providing, to the user, a name of the determined pro player and an opening title representing a chess opening strategy of the determined pro player after a chess match of the user and an opponent ends.

The providing of the game play strategy may include executing, in response to the user selecting a chess opening strategy of the determined pro player, an interface for guiding the selected chess opening strategy to the user based on a game play record of the selected chess opening strategy.

The determining of the pro player may include determining at least one of a first pro player of a game play strategy to be recommended in a case in which the user plays the game before an opponent and a second pro player of a game play strategy to be recommended in a case in which the user plays the game after the opponent.

The determining of the pro player may include determining a chess pro player corresponding to a game play style of the user, and the providing of the game play strategy may include providing a chess opening strategy of the determined chess pro player to the user.

The extracting of the game play feature may include extracting, from the game play data of the user, a feature representing a number of times that a chess piece of the user is caught within a preset number of turns.

The extracting of the game play feature may include extracting, from the game play data of the user, a feature representing a number of times that the user catches an opponent chess piece within a preset number of turns or a preset period of time.

The extracting of the game play feature may include extracting, from the game play data of the user, a feature representing a chess piece selected by the user at a first turn of the chess game and a position to which the selected chess piece is moved.

The extracting of the game play feature may include extracting, from the game play data of the user, a feature representing a tie history of the user.

The extracting of the game play feature may include extracting, from the game play data of the user, a feature representing whether chess castling is used.

The extracting of the game play feature may include extracting, from the game play data of the user, a feature representing a score based on chess pieces remaining on a chessboard when a preset number of turns elapses after the user starts the game.

The player recommendation model may receive the extracted game play feature as an input and output an indicator for a pro player corresponding to the received game play feature.

According to another aspect, there is also provided a training method to train a player recommendation model that identifies a pro player corresponding to a game play style of a user, the method including extracting a game play feature from learning data based on previous game play data of a pro player of a game and training the player recommendation model based on the extracted game play feature.

The learning data may include previous game play data of chess pro players of the chess game.

The player recommendation model may output an indicator of at least one of a first pro player of a game play strategy to be recommended in a case in which the user plays the game before an opponent and a second pro player of a game play strategy to be recommended in a case in which the user plays the game after the opponent, based on the extracted game play feature.

The player recommendation model may be based on a neural network in which parameter values are updated through a learning process.

According to another aspect, there is also provided a game play strategy recommendation apparatus including a memory and a processor, wherein the memory includes instructions to be executed by the processor, and when the instructions are executed by the processor, the processor is configured to record game play data of a user playing a game, extract a game play feature from the game play data, determine a pro player of the game corresponding to a game play style of the user from the extracted game play feature using a player recommendation model, and control the game play strategy recommendation apparatus to provide a game play strategy of the determined pro player to the user.

The game may be a chess game, and the processor may be configured to control the game play strategy recommendation apparatus to provide the user with a name of the determined pro player and an opening title representing a chess opening strategy of the determined pro player after a chess match of the user and an opponent ends.

The processor may be configured to control the game play strategy recommendation apparatus to execute, in response to the user selecting a chess opening strategy of the determined pro player, an interface for guiding the selected chess opening strategy to the user based on a game play record of the selected chess opening strategy.

The processor may be configured to determine at least one of a first pro player of a game play strategy to be recommended in a case in which the user plays the game before an opponent and a second pro player of a game play strategy to be recommended in a case in which the user plays the game after the opponent.

According to another aspect, there is also provided a training apparatus for training a player recommendation model that identifies a pro player corresponding to a game play style of a user, the apparatus including a memory and a processor, wherein the memory includes instructions to be executed by the processor, and when the instructions are executed by the processor, the processor is configured to extract a game play feature from learning data based on previous game play data of a pro player of a game and control the training apparatus to train the player recommendation model based on the extracted game play feature.

The game may be a chess game, and the processor may be configured to control the training apparatus to extract, from the game play data of the user, at least one of a feature representing a number of times that a chess piece of the user is caught within a preset number of turns, a feature representing a number of times that the user catches an opponent chess piece within a preset number of turns or a preset period of time, and a feature representing a chess piece selected by the user at a first turn of the chess game and a position to which the selected chess piece is moved.

The processor may be configured to control the training apparatus to extract, from the game play data of the user, at least one of a feature representing a tie history of the user, a feature representing whether chess castling is used, and a feature representing a score based on chess pieces remaining on a chessboard when a preset number of turns elapses after the user starts the game.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 5 is a diagram illustrating an example of analyzing a game play style of a pro chess player according to an example embodiment;

FIG. 6 is a diagram illustrating an example of a recommended chess opening corresponding to a game play style of a user according to an example embodiment;

DETAILED DESCRIPTION

Figure 1:
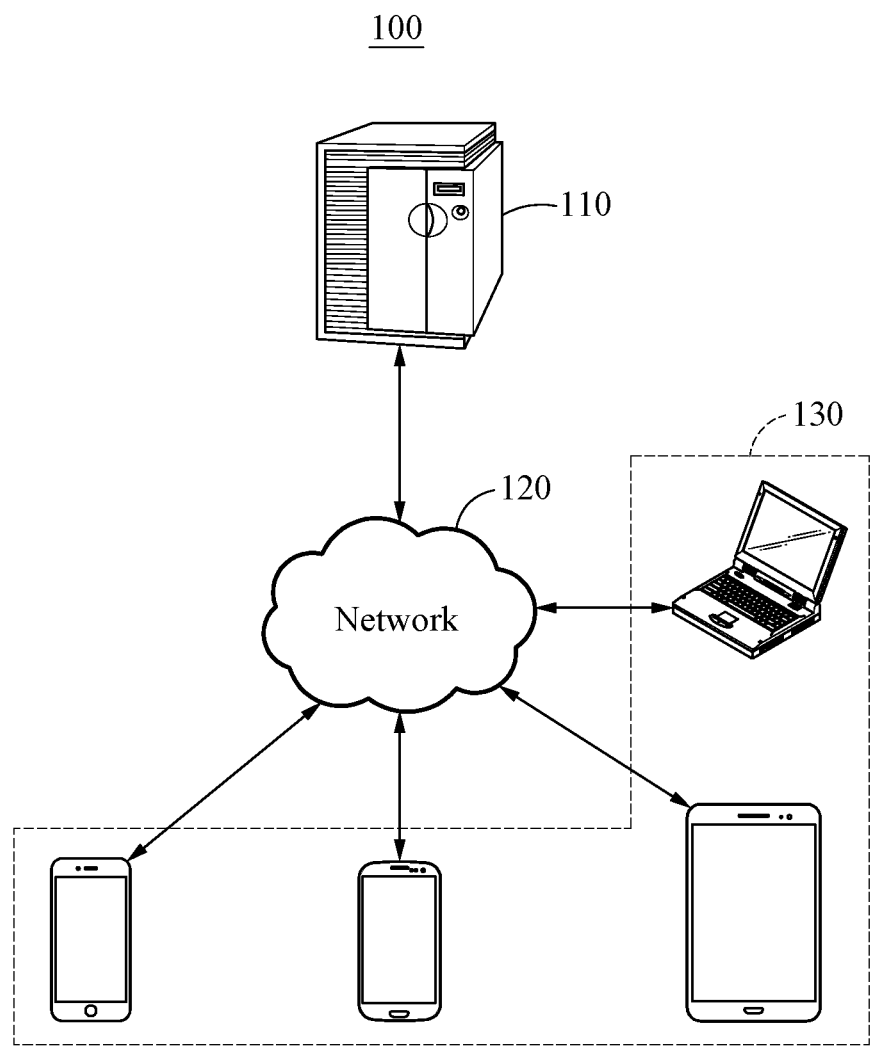
FIG. 1 is a diagram providing an overview of a game system according to an example embodiment.

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 is a diagram providing an overview of a game system according to an example embodiment.

Referring to FIG. 1, a game system 100 provides a game service to a plurality of user terminals 130 through a game server 110. The game system 100 includes the game server 110, a network 120, and the plurality of user terminals 130. The game server 110 and the plurality of user terminals 130 may communicate through the network 120, for example, an Internet communication network, a wired or wireless local-area communication network, or a wide area data network.

The game server 110 may perform an authentication process on the user terminal 130 requesting an access to execute a game program and provide the game service to the authenticated user terminal 130. A user to play a game may execute a game program or a game application installed in the user terminal 130 and send an access request to the game server 110. The user terminal 130 may be a computing device that enables a game play of the user and may be, for example, a cellular phone, a smartphone, a personal computer, a laptop, a notebook, a netbook, a tablet, or a personal digital assistant (PDA). In the present disclosure, the term "user" may be interchangeably used with the term "game user" or "gamer." The user terminal 130 may also be referred to as a game client.

The user terminal 130 may stay connected with the game server 110 through the network 120. The game program of the user terminal 130 may transmit game control information or game play information associated with a game play of the user to the game server 110 such that the game server 110 allows corresponding game play content to be applied to the user terminal 130 of another user. The game server 110 may receive various game control information or game play information from the user terminal 130 and store the received game control information or game play information in a database. Using the game control information, the game server 110 may provide a synchronized game service to users playing the same game simultaneously.

The game server 110 may include a game play strategy recommendation apparatus for recommending a game play strategy to a user. The game play strategy recommendation apparatus may analyze a game play style and a game play propensity of the user based on the game play information of the user and recommend a game play strategy corresponding to the game play style of the user to the user. For example, the game play strategy recommendation apparatus may determine a professional player (hereinafter, referred to as "pro player") having a game play style similar to the game play style of the user and provide a game play strategy of the determined pro player to the user. Here, the pro player may be a pro player of a game played by the user and include both former and current pro players.

For example, when the user plays a chess game, the game play strategy recommendation apparatus may analyze the game play style of the user based on a chess game play of the user and recommend a chess opening of a pro player matching the game play style of the user. Here, the chess opening may indicate, for example, a game play section of about 10 turns including a first turn in an early stage of the chess game.

There are hundreds of chess opening strategies in the chess game, and it is not easy for a user who is new to chess to learn all of the chess opening strategies. The game play strategy recommendation apparatus may determine the game play style of the user and recommend a most suitable chess opening for the game play style, thereby increasing interest and immersion of the user in the game. Also, the game play strategy recommendation apparatus may recommend a game play strategy to the user, thereby effectively preventing the user from leaving the game due to a difficulty of game play or a tiredness of repetitive game play.

Hereinafter, a game play strategy recommendation method performed by the game play strategy recommendation apparatus will be described in detail. For ease of description, the following description will be given of the game play strategy recommendation apparatus and method based on a chess game, for example. However, it is obvious to those skilled in the art that the present disclosure is also applicable to other games such as Janggi, Go, Omok, Othello, Shogi, and the like, for example. Also, the present disclosure may be applied not only to the game system 100 based on the network 120 as illustrated in FIG. 1, but also to a personal computer-based game program or a video console-based game program.

Figure 2:
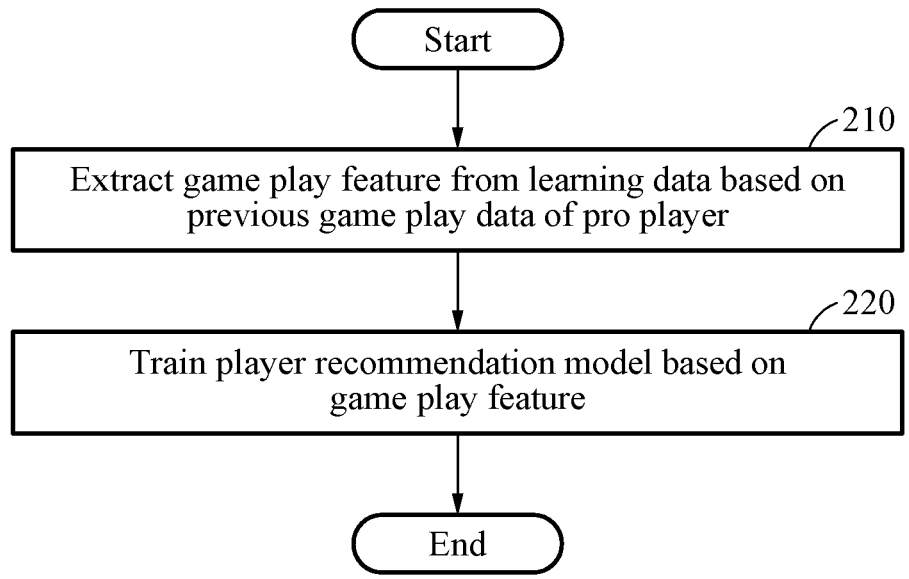
FIG. 2 is a flowchart illustrating an operation of a method of training a player recommendation model according to an example embodiment.

FIG. 2 is a flowchart illustrating an operation of a method of training a player recommendation model according to an example embodiment. The training method may be performed by a training apparatus described in the present disclosure.

A game play strategy recommendation apparatus may identify a pro player having a game play style similar to a game play style of a user using a player recommendation model. The player recommendation model may be based on a neural network in which parameter values are updated through a learning process of machine learning. The neural network of the player recommendation model may include a plurality of layers consisting of a plurality of artificial neurons. A feature value may be input to the player recommendation model. In response to the feature value being input, the player recommendation model may output an indicator or an index that indicates a pro player. As described above, the training apparatus may train the player recommendation model that identifies the pro player corresponding to the game play style of the user.

Referring to FIG. 2, in operation 210, the training apparatus may extract a game play feature from learning data based on previous game play data of a pro player of a game. In terms of the chess game, the learning data may include previous game play data of chess pro players or masters of the chess game. The previous game play data may include an opening strategy recorded in an early stage of a chess game previously played by chess pro players.

The training apparatus may extract at least one feature for acquiring a game play style of the chess game from the learning data. An example of features to be extracted will be described as follows.

(1) The training apparatus may extract a feature representing a number of times that a chess piece of the pro player is caught within a preset number of turns, from the game play data of the pro player. For example, the training apparatus may extract, as the feature, the number of times that chess pieces (e.g., 0 to 5 pieces) are caught within 10 turns in the early stage of the chess game.

(2) The training apparatus may extract a feature representing a number of times that the pro player catches an opponent chess piece within a preset number of turns or a preset period of time, from the game play data of the pro player. Since there are 16 opponent chess pieces in the chess game, the extracted feature may have a value between 0 and 16.

(3) The training apparatus may extract a feature representing a chess piece selected by the pro player at a first turn of the chess game and a position to which the selected chess piece is moved, from the game play data of the pro player. In this instance, there are 20 kinds of possible cases as the first turn.

(4) The training apparatus may extract a feature representing a tie history of the pro player from the learning data including the game play data of the pro player. In this instance, the extracted feature may be designated as "1" in a case of a tie game and "0" in a case of a game other than the tie game.

(5) The training apparatus may extract a feature representing whether chess castling is used, from the game play data of the pro player. The chess castling may be a rule that a chess piece of a queen and a chess piece of a rook are moved simultaneously. In the feature, "1" may be designated when the pro player has used the chess castling and "0" may be designated when the pro player has not used the chess castling. In some cases, in addition to the chess castling, features may be extracted regarding the use of other chess rules such as En passant or promotion.

(6) The training apparatus may extract a feature representing a score based on chess pieces remaining on a chessboard when a preset number of turns elapses after the pro player starts the game, from the game play data of the pro player. For example, based on the game play data of the pro player the training apparatus may calculate, as a score, values of all chess pieces remaining on the chessboard at a $10^{th}$ turn, a $20^{th}$ turn, a $30^{th}$ turn, a $40^{th}$ turn, and a $50^{th}$ turn after the pro player starts the game. In this example, the training apparatus may assign a weight of "9" to the chess piece of the queen, a weight of "5" to the chess piece of the rook, a weight of "4" to a chess piece of each of a bishop and a knight, and a weight of "1" to a chess piece of a pawn. As such, the training apparatus may apply weights to chess pieces remaining on the chessboard at a predetermined turn of the game and obtain a total score based on the weights, thereby calculating a score.

In operation 220, the training apparatus may train the player recommendation model based on the game play feature extracted in operation 210. The training apparatus may perform learning based on the at least one game play feature extracted in operation 210. The extracted game feature may be input to the player recommendation model. The player recommendation model may output an indicator of a pro player corresponding to the input game play feature. For example, when the learning is performed on eight pro players, the player recommendation model may output an index indicating a specific pro player among the eight pro players.

When the a game play feature is extracted from game play data of the specific pro player used for learning and input to the player recommendation model, the training apparatus may perform machine learning including a process of adjusting parameter values included in the player recommendation model such that the player recommendation model outputs the index indicating the corresponding pro player. For example, a backpropagation algorithm may be used to adjust the parameter values, and related description will be omitted since the description is outside the scope of the present disclosure.

The training apparatus may perform the aforementioned learning process on game play data of numerous pro players. In this case, the player recommendation model may learn the corresponding pro players and provide a pro player corresponding to a game play of at least one user among the pro players to the user.

As described above, a feature of the chess play may be extracted based on previous chess play records (e.g., chess notation) of the pro players, so that the player recommendation model is trained based on the extracted feature. The trained player recommendation model may be used to analyze a game play style of the user after the user played the game and identify a pro player similar to the game play style of the user.

Figure 3:
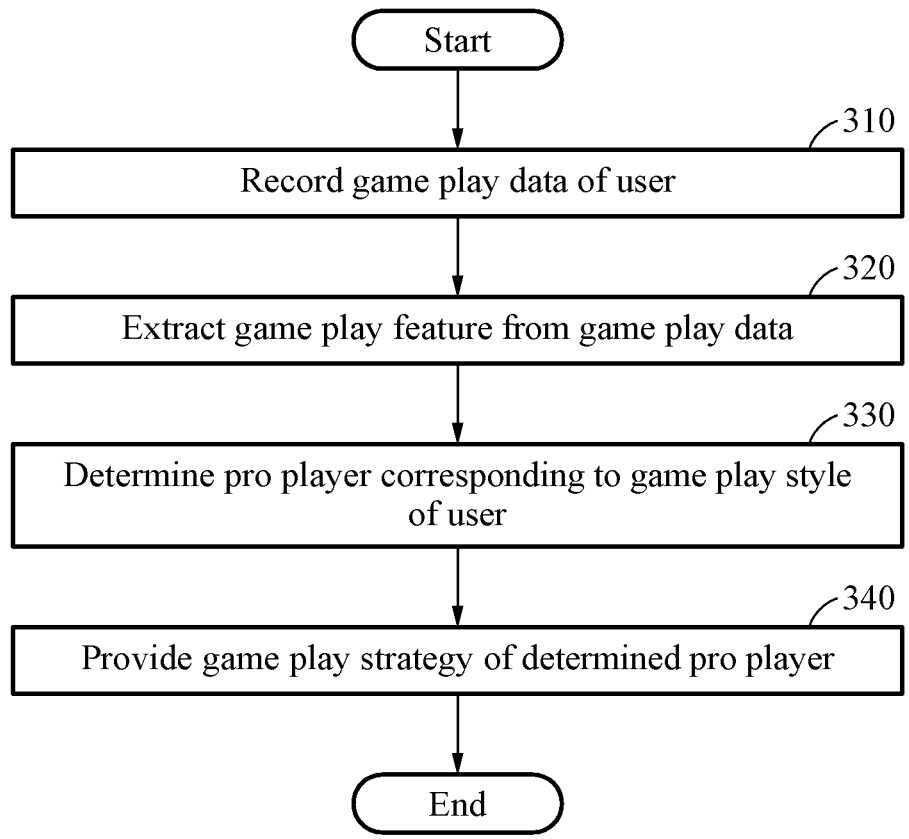
FIG. 3 is a flowchart illustrating an operation of a game play strategy recommendation method according to an example embodiment.

FIG. 3 is a flowchart illustrating an operation of a game play strategy recommendation method according to an example embodiment. The game play strategy recommendation method may be performed by the game play strategy recommendation apparatus described in the present disclosure.

Referring to FIG. 3, in operation 310, the game play strategy recommendation apparatus may record game play data of a user playing a game. The game play strategy recommendation apparatus may store game play data obtained, for example, within a preset number of turns or for a preset period of time from a start of the game. The game play strategy recommendation apparatus may track a game play pattern occurring in a game play of the user and store the game play pattern. In terms of a chess game, the game play strategy recommendation apparatus may track a chess opening strategy pattern used in a chess opening of the user and store the chess opening strategy pattern as the game play data.

In operation 320, the game play strategy recommendation apparatus may extract a game play feature of the user from the game play data. The game play strategy recommendation apparatus may extract game play feature of the user from the game play data to analyze a game play style of the user. Examples of game play features extracted in a chess game will be described below. The game play strategy recommendation apparatus may extract at least one of the following features.

(1) The game play strategy recommendation apparatus may extract a feature representing a number of times that a chess piece of the user is caught within a preset number of turns, from the game play data of the user.

(2) The game play strategy recommendation apparatus may extract a feature representing a number of times that the user catches an opponent chess piece within a preset number of turns or a preset period of time, from the game play data of the user.

(3) The game play strategy recommendation apparatus may extract a feature representing a chess piece selected by the user at a first turn of the chess game and a position to which the selected chess piece is moved, from the game play data of the user.

(4) The game play strategy recommendation apparatus may extract a feature representing a tie history of the user, from the game play data of the user.

(5) The game play strategy recommendation apparatus may extract a feature representing whether a chess rule such as chess castling, En passant, and promotion is used, from the game play data of the user.

(6) The game play strategy recommendation apparatus may extract a feature representing a score based on chess pieces remaining on a chessboard when a preset number of turns elapses after the user starts the game, from the game play data of the user.

The features of (1) through (6) may respectively correspond to the features of (1) through (6) extracted in the learning process of FIG. 2, and repeated description will be omitted.

In operation 330, the game play strategy recommendation apparatus may determine a pro player of the game corresponding to a game play style of the user from the game play feature extracted in operation 320 using a player recommendation model. In the chess game, the game play strategy recommendation apparatus may determine a chess pro player corresponding to the game play style of the user using the player recommendation model.

The player recommendation model may be based on a neural network trained through a learning process based on previous game play data of the pro player. For example, the player recommendation model may be previously trained using the learning method as described with reference to FIG. 2.

The player recommendation model may receive the game play feature extracted in operation 320 as an input and output an indicator for a pro player corresponding to the received game play feature. The game play strategy recommendation apparatus may determine at least one of a first pro player of a game play strategy to be recommended in a case in which the user plays the game before an opponent and a second pro player of a game play strategy to be recommended in a case in which the user plays the game after the opponent, using the player recommendation model.

In operation 340, the game play strategy recommendation apparatus may provide a game play strategy of the pro player determined in operation 330 to the user. When information on the pro player determined in operation 330 is provided to the user, the user may determine whether to receive the game play strategy of the corresponding pro player, through a user input. Also, information on a plurality of pro players having game play styles similar to the game play style of the user may be provided to the user. In this case, the user may select a desired pro player from the pro players to receive a game play strategy of the selected pro player.

The game play strategy recommendation apparatus may provide the user with a game play strategy up to a preset number of game play turns from a start of the game or a game play strategy for a preset period of time from the start of the game.

When the game is the chess game, a chess pro player corresponding to the game play of the user may be determined by the player recommendation model, so that the game play strategy recommendation apparatus provides a chess opening strategy of the determined chess pro player to the user. The game play strategy recommendation apparatus may provide the user with a name of the determined chess pro player and an opening title representing a chess opening strategy of the determined chess pro player after a chess match of the user and an opponent ends. In response to the user selecting a chess opening strategy of the determined chess pro player, the game play strategy recommendation apparatus may execute an interface for guiding the selected chess opening strategy to the user based on a game play record of the selected chess opening strategy.

As described above, the game play strategy recommendation apparatus may determine a pro player corresponding to the game play of the user based on game play data collected from the user, extract a game play strategy of the determined pro player from a database, and provide the extracted game play strategy to the user. The database may include game play strategy information of a plurality of pro players and also include information on a plurality of game play strategies of a single player.

According to the present disclosure, in the chess game or the like, the game play strategy recommendation apparatus may provide a chess opening strategy suitable for a chess game play propensity of the user, thereby guiding the user to play the chess game more fun and advantageous. Through this, the user may learn a game play strategy suitable for the game play style of the user among various game play strategies, which may increase the user's interest and fun with the game.

Figure 4:
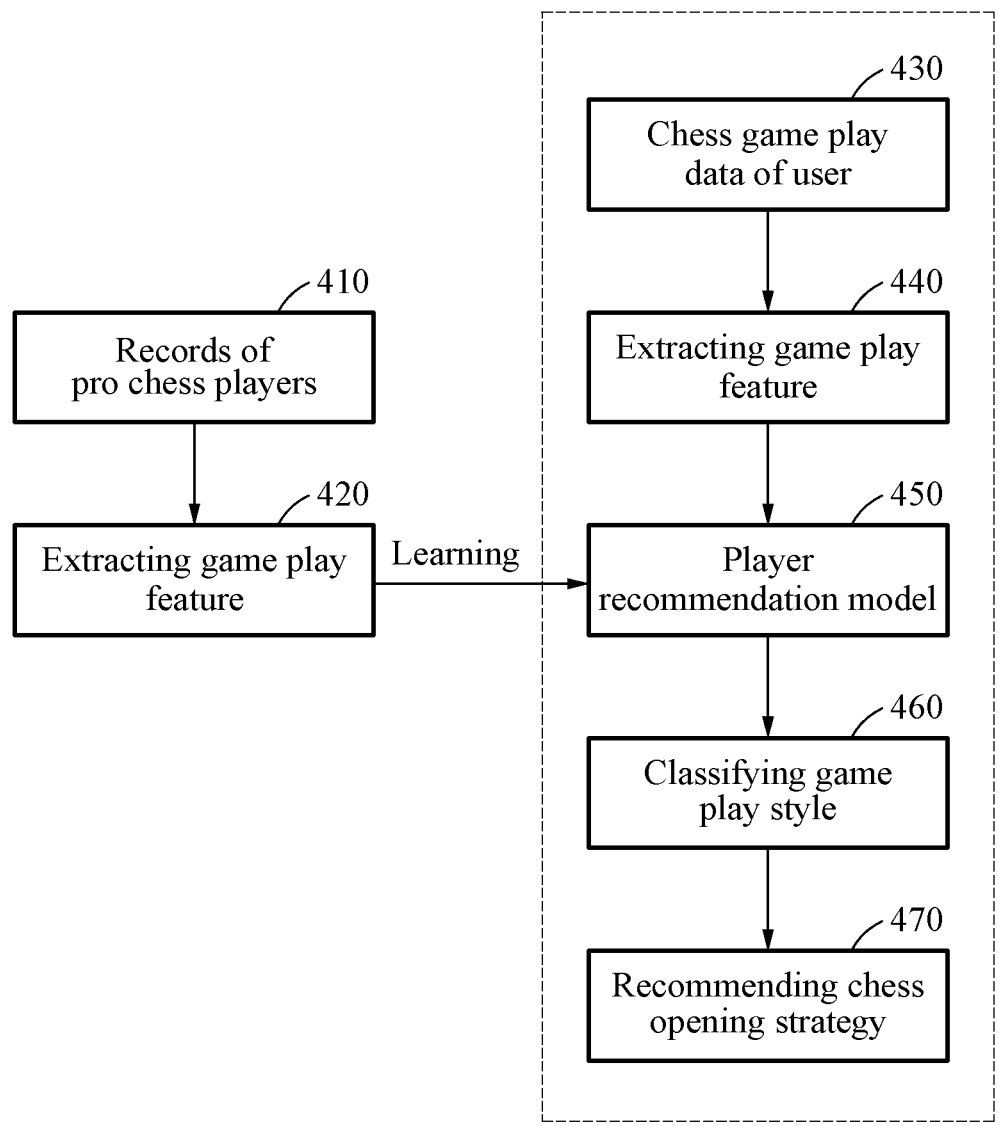
FIG. 4 is a diagram illustrating a game play strategy recommendation method for a chess game according to an example embodiment.

FIG. 4 is a diagram illustrating a game play strategy recommendation method for a chess game according to an example embodiment.

FIG. 4 illustrates a process of recommending a game play strategy matching a game play style of a user in a chess game. A training apparatus may extract a game play feature related to a chess opening of an early stage of the chess game from records 410 in operation 420. Here, the records 410 may be previous game play data of pro chess players. For example, the training apparatus may extract at least one of the features (1) through (6) of FIG. 2 from the records 410 as the game play feature.

Thereafter, the training apparatus may train a player recommendation model 450 based on the extracted game play feature. The training apparatus may adjust parameter values of a neural network included in the player recommendation model 450 such that the player recommendation model 450 outputs an indicator indicating a specific pro chess player when the game play feature extracted from a record of the specific pro chess player is input to the player recommendation model 450. The training apparatus may perform such learning process on each of a plurality of pro chess players.

When the learning of the player recommendation model 450 is completed, the game play strategy recommendation apparatus may recommend a game play strategy corresponding to a game play style of the user using the trained player recommendation model 450. First, the game play strategy recommendation apparatus may record chess game play data 430 of the user. The game play strategy recommendation apparatus may extract a game play feature related to the chess opening of the early stage of the chess game from the chess game play data 430 in operation 440. The game play strategy recommendation apparatus may extract at least one of the features of (1) through (6) described with reference to FIG. 3 as the game play feature. In this example, a type of the extracted game play feature may be the same as that of the game play feature extracted in operation 420.

Thereafter, the game play strategy recommendation apparatus may classify the game play style of the user the trained player recommendation model 450 in operation 460. The game play strategy recommendation apparatus may determine a pro chess player corresponding to the game play style of the user by applying the game play feature extracted in operation 440 to the player recommendation model 450. The game play feature extracted in operation 440 may be input to the player recommendation model 450. The player recommendation model 450 may output an indictor indicating a specific pro chess player as an output corresponding to the input game play feature.

The game play strategy recommendation apparatus may recommend a chess opening strategy of the pro chess player determined using the player recommendation model 450 in operation 470. When the user requests provision of the chess opening strategy, the game play strategy recommendation apparatus may execute an interface for guiding the corresponding chess opening. In this example, the game play strategy recommendation apparatus may provide a guide for the chess opening strategy to the user on a turn-by-turn basis such that the user learns a specific chess opening strategy of the corresponding pro chess player.

FIG. 5 is a diagram illustrating an example of analyzing a game play style of a pro chess player according to an example embodiment.

A table of FIG. 5 shows a game play style analyzed in association with a chess opening strategy for each pro chess player. As shown in the table, a training apparatus may train a player recommendation model based on records which is previous game play data of pro chess players having different game play styles. According to the table, a game play style of Mikhail Tal is technical, aggressive, and intuitive. Also, a game play style of Wilhelm Steinitz is locational, defensive, and calculative.

FIG. 6 is a diagram illustrating an example of a recommended chess opening corresponding to a game play style of a user according to an example embodiment.

A table of FIG. 6 shows examples of recommended chess opening strategies matching a game play style of a user. For example, the game play style of the user and game play styles of pro chess players may be classified into eight types [1] through [8]. In this example, a recommended chess opening strategy may be provided for each game play style corresponding to each of the types. The game play strategy recommendation apparatus may recommend, to the user, a chess opening strategy typically used by pro chess players having similar game play propensities to that of the user. Here, the recommended opening strategy may vary depending on whether the user plays first or second (white or black) in the chess game. In the table, encyclopedia of chess openings (ECO) may be an identifier for identifying each chess opening strategy.

Figure 7:
FIGS. 7 and 8 are diagrams illustrating examples of providing a chess opening strategy to a user according to an example embodiment.
Figure 8:
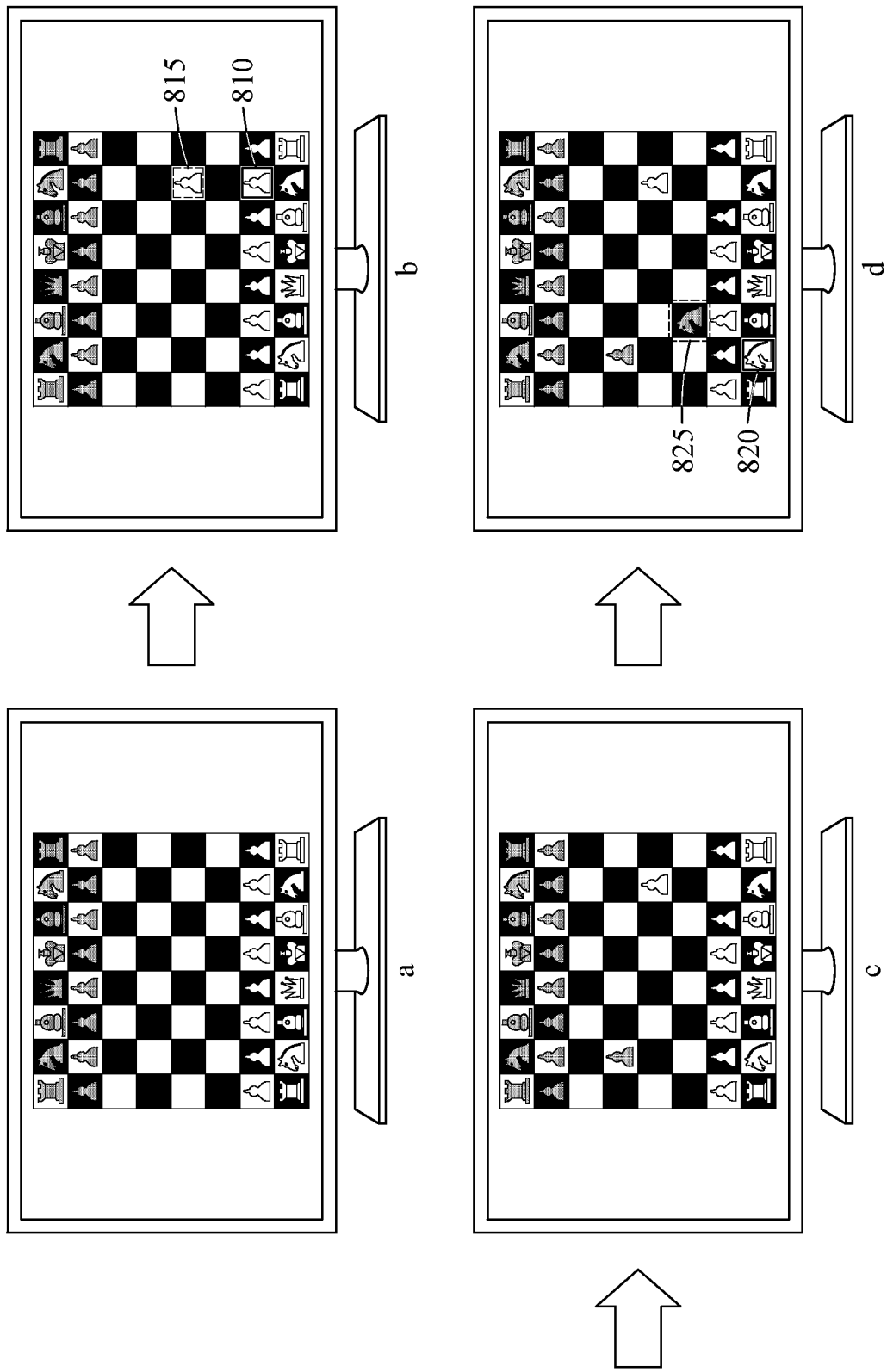

FIGS. 7 and 8 are diagrams illustrating examples of providing a chess opening strategy to a user according to an example embodiment.

FIG. 7 illustrates an example of analyzing a game play style of a user in a chess game and providing a chess opening strategy to be recommended based on an analysis result. For example, a game play strategy recommendation apparatus may record game play data while the user plays a chess game match and suggests, to the user, a chess opening strategy of a pro chess player determined based on the game play data when the chess game match ends.

The game play strategy recommendation apparatus may extract a game play feature related to the chess game from the recorded game play data of the user and apply the extracted game play feature to the player recommendation model, thereby identifying a pro chess player having a most similar game play style to that of the user. The game play strategy recommendation apparatus may provide at least one chess opening strategy of an identified pro chess player to the user. In this example, the game play strategy recommendation apparatus may provide the user with a title of a chess opening strategy of the pro chess player along with a name of the pro chess player. The game play strategy recommendation apparatus may recommend the chess opening strategy for each chess game side (play first (black), play second (white)) for recommendation. In the example of FIG. 7, "Wilhelm Steinitz" is a name of a pro chess player corresponding to the game play style of the user identified by the player recommendation model. Also, "Vienna Game", "King's Gambit", and "Ruy Lopez" are titles of chess openings of "Wilhelm Steinitz" to be recommended to the user.

The user may select a desired chess opening strategy from suggested recommended chess opening strategies, for example, Vienna Game, King's Gambit, and Ruy Lopez. When the user selects a specific chess opening strategy, as illustrated in FIG. 8, an interface for the user to learn the selected chess opening strategy may be executed. In some cases, the game play strategy recommendation apparatus may automatically select a chess opening strategy to be recommended to the user and execute a guide interface.

FIG. 8 illustrates a game play screen changing in an order of (a)→(b)→(c)→(d) with time. Once the guide interface is executed, the game screen may be displayed as shown in a screen (a). Thereafter, a guide for a chess opening strategy of a specific pro chess player recommended to the user may be provided. For example, as shown in a screen (b), the recommended chess opening strategy may inform the user that a chess piece 810 of a pawn is moved to a position 815. The position 815 may be, for example, indicated by an outline or blurred, but the scope of the embodiment is not limited thereto. For example, a guide "select the chess piece 810 and move to the position 815" may be provided to the user.

A screen (c) may be a screen displaying a result obtained when the user moves the chess piece 810 to the position 815 at a user's turn according to the guide and an opponent plays a next turn in response thereto. Thereafter, as shown in a screen (d), the game play strategy recommendation apparatus may guide a chess piece manipulation at a second turn according to the chess opening strategy of the specific pro chess player recommended to the user. For example, the user may be guided to select a chess piece 820 and move the chess piece 820 to a position 825. To learn the chess opening strategy, the user may move the chess piece 820 to the position 825 according to the guide. As such, the user may learn a chess piece manipulation flow indicated in the chess opening strategy recommended in sequence, thereby effectively learning an early stage opening strategy of the pro chess player having the most similar game play style to that of the user.

A name of the chess opening strategy provided according to the guide may be displayed in a portion of the screen on which the guide interface is provided. When the user does not play the game in accordance with the provided chess opening strategy, the game play strategy recommendation apparatus may analyze game play data on the game currently played by the user and search for another pro chess pro player corresponding to the game play style of the user. As a search result, when another pro chess pro player corresponding to the game play style of the user is present, the game play strategy recommendation apparatus may provide a chess opening strategy of the corresponding pro chess player to the user. The provided chess opening strategy may be immediately applied to the game play of the user even during the game play. The title of the previous the chess opening strategy on the screen may be changed to a title of the currently provided chess opening strategy.

In some cases, the game play strategy recommendation apparatus may provide ranking information related to a preference or a recommendation count for each chess opening strategy to the user.

Figure 9:
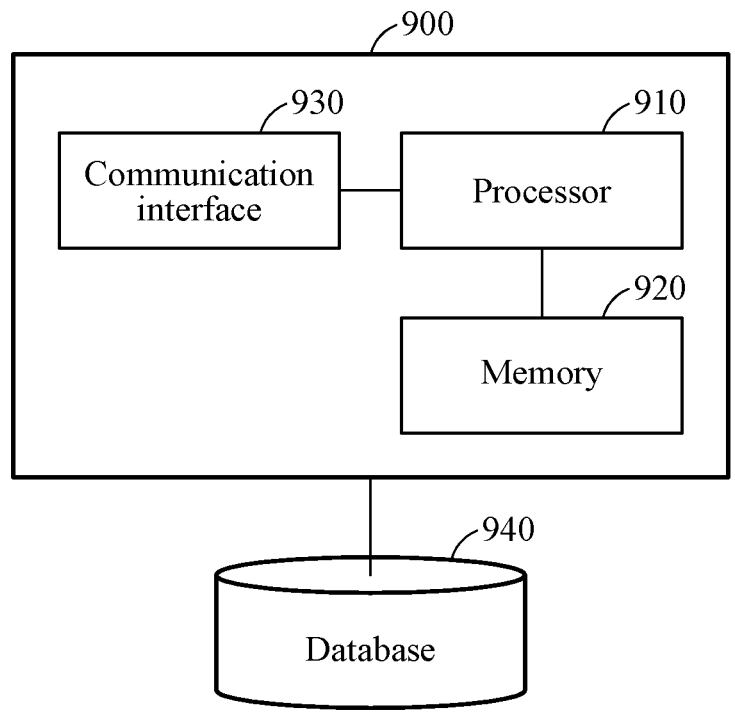
FIG. 9 is a diagram illustrating a training apparatus according to an example embodiment.

FIG. 9 is a diagram illustrating a training apparatus according to an example embodiment.

Referring to FIG. 9, a training apparatus 900 may include a processor 910, a memory 920, and a communication interface 930. The training apparatus 900 may further include a database 940. The training apparatus 900 may correspond to the training apparatus described in the present disclosure and operate in the game server 110 of FIG. 1.

The memory 920 may be connected to the processor 910 and store instructions to be executed by the processor 910, data to be computed by the processor 910, or data processed by the processor 910. The memory 920 may include a non-transitory computer-readable medium such as a fast random access memory and/or non-volatile computer-readable storage medium (e.g., one or more disk storage, flash memory devices, or other non-volatile solid state memory devices).

The communication interface 930 may provide an interface for communicating with an external device. The communication interface 930 may communicate with the external device through a wired or wireless network.

The database 940 may store learning data and information required to operate the training apparatus 900. For example, the database 940 may include previous game play data of a pro player as learning data tor training a player recommendation model and game play data of users.

The processor 910 may execute functions and instructions to be performed in the training apparatus 900 and control an overall operation of the training apparatus 900.

The processor 910 may be implemented by using a processing circuitry, for example, hardware/software combination such as a processor executing software, hardware components including logic circuits or a combination thereof. The processing circuitry may include, for example, a central processing unit (CPU), an arithmetic logic unit (ALU), a digital signal processor, a microcomputer, a field programmable gate array (FPGA), a system-on-chip (SoC), a programmable logic unit, a microprocessor, or an application-specific integrated circuit (ASIC), and it is construed as not limiting the scope of the present disclosure.

The processor 910 may provide a learning interface to a user. The processor 910 may perform one or more operations related to the operations of the training apparatus described with reference to FIGS. 2 and 4. For example, the processor 910 may train a player recommendation model that identifies a pro player corresponding to a game play style of the user. The processor 910 may extract a game play feature from learning data based on previous game play data of a pro player of a game and control the training apparatus 900 to train the player recommendation model based on the extracted game play feature.

Figure 10:
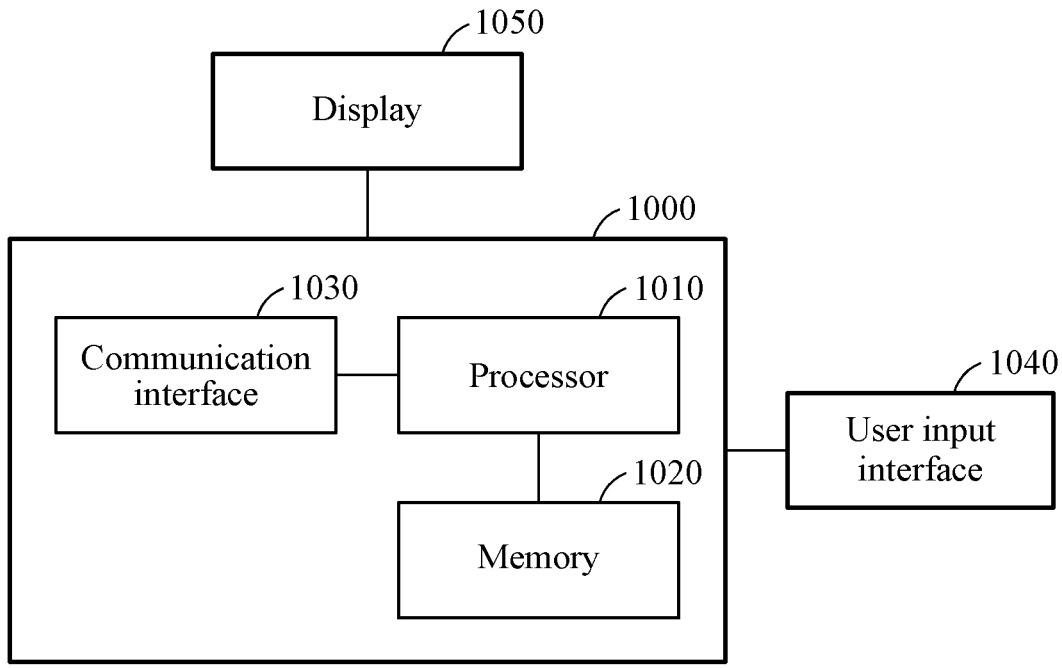
FIG. 10 is a diagram illustrating a game play strategy recommendation apparatus according to an example embodiment.

FIG. 10 is a diagram illustrating a game play strategy recommendation apparatus according to an example embodiment.

Referring to FIG. 10, a game play strategy recommendation apparatus 1000 may include a processor 1010, a memory 1020, and a communication interface 1030. The game play strategy recommendation apparatus 1000 may further include a user input interface 1040, a display 1050, and a database (not shown). The game play strategy recommendation apparatus 1000 may correspond to the game play strategy recommendation apparatus described in the present disclosure and operate in the game server 110 of FIG. 1.

The memory 1020 may be connected to the processor 1010 and store instructions to be executed by the processor 1010, data to be computed by the processor 1010, or data processed by the processor 1010. The memory 1020 may include a non-transitory computer-readable medium, for example, a fast random access memory and/or non-volatile computer-readable storage medium.

The communication interface 1030 may provide an interface for communicating with an external device. The communication interface 1030 may communicate with the external device through a wired or wireless network.

The user input interface 1040 may receive a user input that is input by a user. In an example embodiment, the user input interface 1040 may receive a user input including a game play strategy provision request. The display 1050 may display a screen of a game play executed by the processor 1010. For example, the display 1050 may be a monitor or a touchscreen display.

The processor 1010 may execute functions or instructions to be performed in the game play strategy recommendation apparatus 1000 and control an overall operation of the game play strategy recommendation apparatus 1000. The processor 1010 may perform one or more operations related to the game play strategy recommendation method described herein. For example, the processor 1010 may record game play data of a user playing a game and control the game play strategy recommendation apparatus 1000 to extract a game play feature from the game play data. Thereafter, the processor 1010 may determine a pro player corresponding to a game play style of the user acquired from the extracted game play feature using a player recommendation model, and control the game play strategy recommendation apparatus 1000 to provide a game play strategy of the determined pro player to the user. The processor 1010 may retrieve game play strategy information of the determined pro player from a database and execute a guide interface for providing the game play strategy information of the pro player.

The processor 1010 may be implemented by using a processing circuitry, for example, hardware/software combination such as a processor executing software, hardware components including logic circuits or a combination thereof. The processing circuitry may include, for example, a CPU, an ALU, a digital signal processor, a microcomputer, a FPGA, a SoC, a programmable logic unit, a microprocessor, or an ASIC, and it is construed as not limiting the scope of the present disclosure.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A game play strategy recommendation method performed by a game play strategy recommendation apparatus comprising a processor and a memory to recommend a game play strategy to a user terminal, the method comprising:
   the processor recording in the memory game play data of a user playing a game at the user terminal, the user terminal being one of a plurality of user terminals that communicate with a game server, the user terminal transmitting game control information and the game play data to the game server, the game server providing a synchronized game service to the plurality of user terminals;
   the processor controlling the game play strategy recommendation apparatus in extracting a game play feature from the game play data;
   the processor controlling the game play strategy recommendation apparatus in determining a pro player of the game corresponding to a game play style of the user from the extracted game play feature using a player recommendation model, the player recommendation model comprising a neural network that has been trained based on previous game play data of the pro player and by adjusting parameter values of the neural network based on the previous game play data, the determining comprising the neural network receiving the game play feature and outputting an indicator for the pro player corresponding to the received game play feature;
   the processor controlling the game play strategy recommendation apparatus in providing a game play strategy of the determined pro player to the user terminal; and
   wherein the game is a chess game, and the providing of the game play strategy comprises providing, to the user terminal, a name of the determined pro player and an opening title representing a chess opening strategy of the determined pro player after a chess match of the user and an opponent ends.

2. The game play strategy recommendation method of claim 1, wherein the providing of the game play strategy comprises:
   providing, to the user terminal, the game play strategy up to a preset number of game play turns from a start of the game or the game play strategy for a preset period of time from the start of the game.

3. The game play strategy recommendation method of claim 1, wherein the game is a chess game, and
   the providing of the game play strategy comprises:
   executing, in response to the user selecting a chess opening strategy of the determined pro player, an interface for guiding the selected chess opening strategy to the user based on a game play record of the selected chess opening strategy.

4. The game play strategy recommendation method of claim 1, wherein the determining of the pro player comprises:
   determining at least one of a first pro player of the game play strategy to be recommended in a case in which the user plays the game before an opponent and a second pro player of the game play strategy to be recommended in a case in which the user plays the game after the opponent.

5. The game play strategy recommendation method of claim 1, wherein the game is a chess game,
   the determining of the pro player comprises:
   determining a chess pro player corresponding to the game play style of the user, and
   the providing of the game play strategy comprises:
   providing a chess opening strategy of the determined chess pro player to the user.

6. The game play strategy recommendation method of claim 1, wherein the game is a chess game, and
   the extracting of the game play feature comprises:
   extracting, from the game play data of the user, at least one of a feature representing a number of times that a chess piece of the user is caught within a preset number of turns, a feature representing a number of times that the user catches an opponent chess piece within a preset number of turns or a preset period of time, and a feature representing a chess piece selected by the user at a first turn of the chess game and a position to which the selected chess piece is moved.

7. The game play strategy recommendation method of claim 1, wherein the game is a chess game, and
   the extracting of the game play feature comprises:
   extracting, from the game play data of the user, at least one of a feature representing a tie history of the user, a feature representing whether chess castling is used, and a feature representing a score based on chess pieces remaining on a chessboard when a preset number of turns elapses after the user starts the game.

8. The game play strategy recommendation method of claim 1, wherein the player recommendation model receives the extracted game play feature as an input and outputs an indicator for the pro player corresponding to the received game play feature.

9. The game play strategy recommendation method of claim 1, wherein the player recommendation model comprises a neural network trained through a learning process based on previous game play data of the pro player.

10. A non-transitory computer-readable medium comprising a program for instructing a processor to perform a game play strategy recommendation method by:
    the processor recording in the memory game play data of a user playing a game at the user terminal, the user terminal being one of a plurality of user terminals that communicate with a game server, the user terminal transmitting game control information and the game play data to the game server, the game server providing a synchronized game service to the plurality of user terminals;

the processor controlling the game play strategy recommendation apparatus in extracting a game play feature from the game play data;

the processor controlling the game play strategy recommendation apparatus in determining a pro player of the game corresponding to a game play style of the user from the extracted game play feature using a player recommendation model, the player recommendation model comprising a neural network that has been trained based on previous game play data of the pro player and by adjusting parameter values of the neural network based on the previous game play data, the determining comprising the neural network receiving the game play feature and outputting an indicator for the pro player corresponding to the received game play feature;

the processor controlling the game play strategy recommendation apparatus in providing a game play strategy of the determined pro player to the user terminal; and wherein the game is a chess game, and the providing of the game play strategy comprises providing, to the user terminal, a name of the determined pro player and an opening title representing a chess opening strategy of the determined pro player after a chess match of the user and an opponent ends.

11. A game play strategy recommendation apparatus comprising:

a memory; and a processor, wherein the memory comprises instructions to be executed by the processor, and when the instructions are executed by the processor, the processor is configured to:

record in the memory game play data of a user playing a game at a user terminal, the user terminal being one of a plurality of user terminals that communicate with a game server, the user terminal transmitting game control information and the game play data to the game server, the game server providing a synchronized game service to the plurality of user terminals;

control the game play strategy recommendation apparatus to extract a game play feature from the game play data;

control the game play strategy recommendation apparatus to determine a pro player of the game corresponding to a game play style of the user from the extracted game play feature using a player recommendation model, the player recommendation model comprising a neural network that has been trained based on previous game play data of the pro player and by adjusting parameter values of the neural network based on the previous game play data, the determining comprising the neural network receiving the game play feature and outputting an indicator for the pro player corresponding to the received game play feature;

control the game play strategy recommendation apparatus to control the game play strategy recommendation apparatus to provide a game play strategy of the determined pro player to the user; and wherein the game is a chess game, and the processor is configured to control the game play strategy recommendation apparatus to provide the user terminal with a name of the determined pro player and an opening title representing a chess opening strategy of the determined pro player after a chess match of the user and an opponent ends.

12. The game play strategy recommendation apparatus of claim 11, wherein the game is a chess game, and the processor is configured to control the game play strategy recommendation apparatus to execute, in response to the user selecting a chess opening strategy of the determined pro player, an interface for guiding the selected chess opening strategy to the user terminal based on a game play record of the selected chess opening strategy.

13. The game play strategy recommendation apparatus of claim 11, wherein the processor is configured to determine at least one of a first pro player of a game play strategy to be recommended in a case in which the user plays the game before an opponent and a second pro player of a game play strategy to be recommended in a case in which the user plays the game after the opponent.

* * * * *